United States Patent
Hood et al.

(10) Patent No.: US 9,004,522 B1
(45) Date of Patent: Apr. 14, 2015

(54) PIVOTING TOW HOOK

(71) Applicant: Amanda Belt-Bolt Company, Logan, OH (US)

(72) Inventors: Michael Hood, Logan, OH (US);
Robert Gruschow, Northville, MI (US);
Wes Holmes, Mesa, AZ (US)

(73) Assignee: Amanda Bent-Bolt Company, Logan, OH (US)

( * ) Notice: Subject to any disclaimer, the term of this patent is extended or adjusted under 35 U.S.C. 154(b) by 0 days.

(21) Appl. No.: 14/483,665

(22) Filed: Sep. 11, 2014

Related U.S. Application Data

(63) Continuation-in-part of application No. 14/227,657, filed on Mar. 27, 2014, now Pat. No. 8,960,707, which is a continuation-in-part of application No. 13/838,646, filed on Mar. 15, 2013.

(51) Int. Cl.
*B60D 1/18* (2006.01)
*F16B 45/00* (2006.01)

(52) U.S. Cl.
CPC .. *B60D 1/187* (2013.01); *B60D 1/18* (2013.01)

(58) Field of Classification Search
CPC ............ B60D 1/04; B60D 1/18; B60D 1/182;
B60D 1/185; B60D 1/187; B60D 1/488;
B60D 1/52; B60D 1/565
See application file for complete search history.

(56) References Cited

U.S. PATENT DOCUMENTS

| | | | |
|---|---|---|---|
| 735,445 | A | 8/1903 | Banks |
| 1,476,627 | A | 12/1923 | Luebke et al. |
| 1,484,495 | A | 2/1924 | Hatherley |
| 1,572,347 | A | 2/1926 | Joseph |
| 1,889,633 | A | 11/1932 | Butterworth |
| 2,165,377 | A | 7/1939 | Henry |
| 2,827,307 | A | 3/1958 | Osborn |
| 3,205,545 | A | 9/1965 | Ring |
| 3,729,926 | A | 5/1973 | Buske |
| 4,426,100 | A | 1/1984 | Yamabe et al. |
| 4,700,917 | A | 10/1987 | Dillman |
| 4,858,977 | A | 8/1989 | Mitchell |
| 5,997,063 | A | 12/1999 | McCraw |
| 6,536,794 | B2 | 3/2003 | Hancock et al. |

(Continued)

OTHER PUBLICATIONS

Tiger Industrial Inc., "Check out the New Billet Aluminum Tiger Claw!" [Online]. Apr. 30, 2009 [retrived on Feb. 7, 2009]. Retrieved from the Internet: <URL: https://web.archive.org/web/20090430234129/http://www.tigerhitch.com/products.htm>.

(Continued)

*Primary Examiner* — Joseph Rocca
*Assistant Examiner* — Marc A Scharich
(74) *Attorney, Agent, or Firm* — Hahn, Loeser & Parks, LLP

(57) ABSTRACT

Disclosed is a tow adapter for coupling a device to be towed to a towing vehicle. The tow adapter includes a bracket adapted to be attached to the towing vehicle, a loop suitable to support a tether to enable the towing vehicle to tow the device to be towed, the loop having first and second ends operably mounted to the bracket, a hook operably mounted to the bracket and positioned central of the loop such that at least part of a curved portion of the hook is disposed within the loop, the hook and the loop being pivotable relative to the bracket about a pivot operably attached to the bracket. The tether may be threaded through the loop and attached to the hook to enable the towing vehicle to tow the device to be towed.

20 Claims, 2 Drawing Sheets

(56) References Cited

U.S. PATENT DOCUMENTS

| | | |
|---|---|---|
| 6,672,609 B2 | 1/2004 | Pierman et al. |
| 6,712,379 B2 | 3/2004 | Graham et al. |
| 7,758,060 B2 | 7/2010 | Lopez et al. |
| 7,823,942 B1 | 11/2010 | McCraw et al. |
| 7,862,066 B2 | 1/2011 | Smith |
| 7,871,097 B2 | 1/2011 | Sparkes et al. |
| 8,636,297 B2 | 1/2014 | Merten et al. |
| 2002/0140206 A1 | 10/2002 | Lloyd |
| 2007/0045985 A1 | 3/2007 | Markley |
| 2009/0108566 A1 | 4/2009 | Asjad |
| 2009/0278333 A1 | 11/2009 | Lopez et al. |

OTHER PUBLICATIONS

International Search Report PCT/US/14127068 Mailed Jul. 30, 2014.

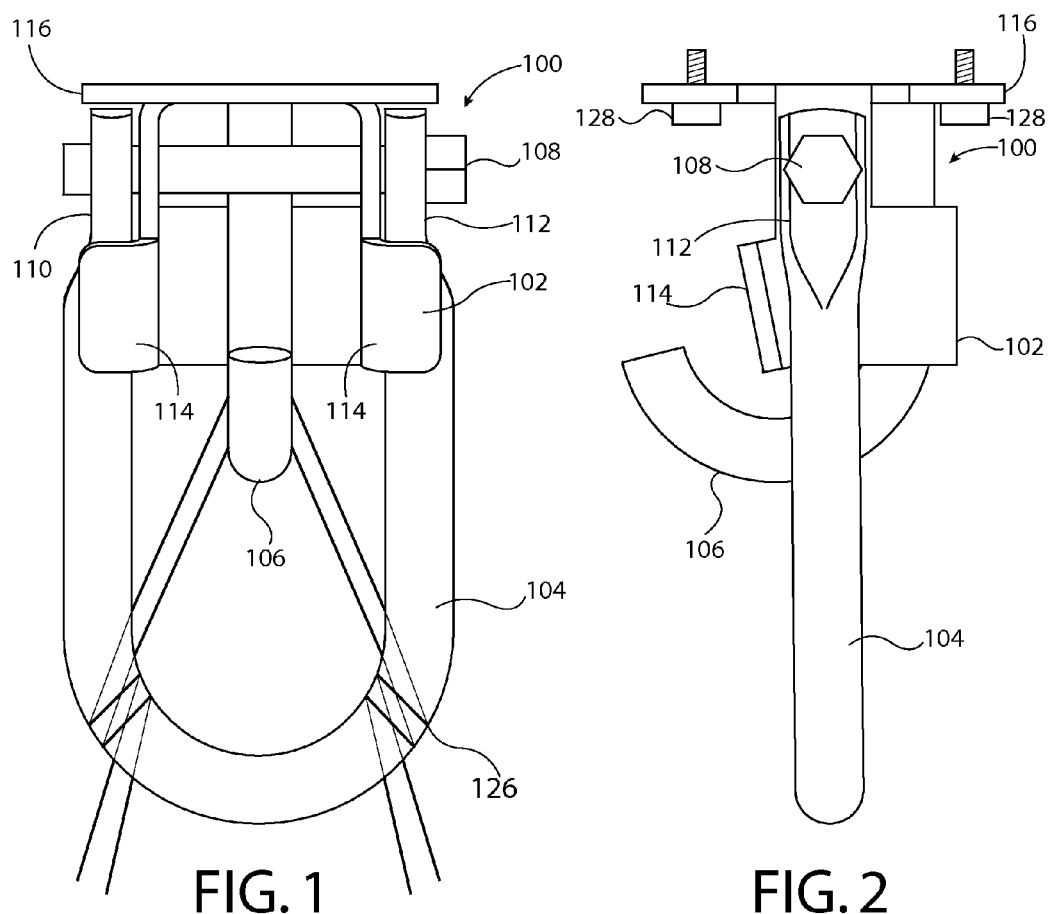
FIG. 1
FIG. 2
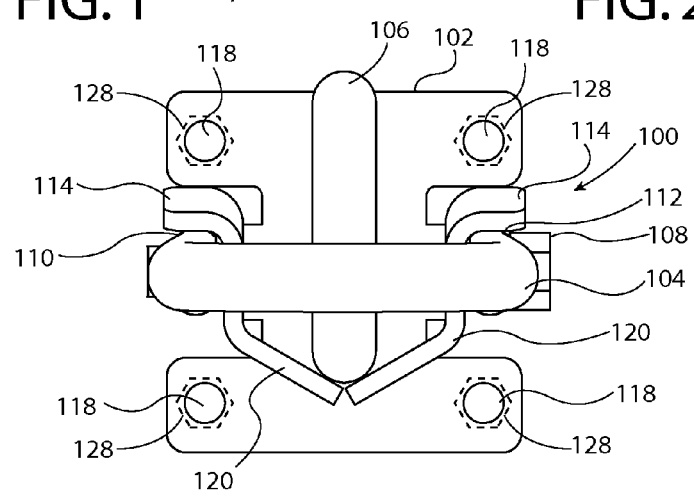
FIG. 3

PIVOTING TOW HOOK

The present application is a continuation-in-part of and claims priority to U.S. application Ser. No. 14/227,657, filed Mar. 27, 2014, the contents of which are hereby incorporated in their entirety. This application also incorporates by reference the entire contents of U.S. application Ser. No. 13/838,646, filed Mar. 15, 2013.

BACKGROUND AND SUMMARY

This invention is directed to a novel tow hook for securing a device to be towed to a towing vehicle. More specifically, described is a novel tow hook for securing a device to be towed to a towing vehicle having a bracket secured to the towing vehicle and a loop and hook for securing a tether where the loop and hook are pivotable relative to the bracket.

One common method of coupling a towing vehicle to a device to be towed is by means of a tether, such as a chain, strap, rope or the like. Various tow adapters for coupling towing vehicles to devices to be towed by a tether have been proposed in the prior art. These prior art devices do not allow for attaching the tether to the towing adapter securely, requiring the tether to be tied or otherwise attached to the tow adapter. Moreover, these prior art tow adapters are not flexible and receptive to facilitate towing.

It may be desired to tow a vehicle using a hook-and-loop assembly for securely connecting a towing vehicle to a device to be towed by means of a tether. However, when the towing vehicle is not being used to tow a device, it may be desirable to have the towing adapter moved to a storage position to prevent damage or injury. It is therefore desirous to have a tow hook system that is capable of selectively accommodating a tether secured to a hook and loop assembly or being moved to a storage position.

Disclosed is a tow adapter for coupling a device to be towed to a towing vehicle. The device comprises a bracket adapted to be attached to a vehicle to support a tow adapter; a loop suitable to support a tether to enable the towing vehicle to tow a device to be towed, the loop having a first end and a second end each adapted to be mounted to the bracket; a hook positioned central of the loop, the loop and hook pivotable relative to the bracket; and the hook and loop are adapted to enable a tether to thread through the loop and attach to the hook.

According to a first alternative embodiment, the loop may be secured to the hook and the hook and loop pivot together relative to the bracket. In another embodiment, the hook and loop pivot independently relative to one another.

The tow adapter may include a pin or threaded rod adapted to provide the pivot between the bracket and loop and hook.

The bracket of the tow adapter may be alternatively a single stamped piece having a portion providing stops for the loop or hook; or may be a welded assembly including a stop for at least one of the loop or hook.

Also disclosed in this application is a kit for a tow adapter suitable for coupling a device to be towed to a towing vehicle. The kit includes a bracket securable to the towing vehicle, the bracket includes a U-shaped loop having opposite first and second ends for receiving a tether for towing the device to be towed and a hook central of the opposite first and second ends. The hook and loop are pivotable relative to the bracket. The kit also includes fasteners suitable to fasten the bracket to the vehicle.

In one embodiment, the kit includes a tether, such as a chain or strap, for coupling the device to be towed to the towing vehicle.

In various other embodiments, the bracket is a single stamped piece having a portion providing stops for the loop or hook. Further to this embodiment, the loop may pivot relative to the bracket. In further aspects, the first and second ends each include an opening for receiving a pin and the kit further includes said pin. The pin may be a threaded rod.

In another embodiment, the bracket comprises a welded assembly. Further to this embodiment, the hook pivots relative to the bracket. The hook pivots about a pin or threaded rod. The hook may be secured to the pin and include a stop for limiting rotation of the hook about the pin.

Finally disclosed is a method for securing a device to be towed to a towing vehicle. The method includes the steps of assembling a tow adapter having a loop suitable to support a tether to enable the vehicle to tow a device to be towed, the loop having a first end and a second end attached to a bracket and a hook attached to the bracket central of the loop, the loop and hook pivotable relative to the bracket; attaching the bracket to the vehicle; and attaching a tether to the device to be towed, threading the tether over and through the loop, and attaching the tether to the hook.

In various alternative embodiments of this method, the hook and loop may be pivotable relative to one another.

BRIEF DESCRIPTION OF DRAWINGS

FIG. 1 is a top view of a tow adapter according to a first embodiment;

FIG. 2 is a side view of the tow adapter according to the first embodiment;

FIG. 3 is a front view of the tow adapter according to the first embodiment;

DETAILED DESCRIPTION

Figure 4:
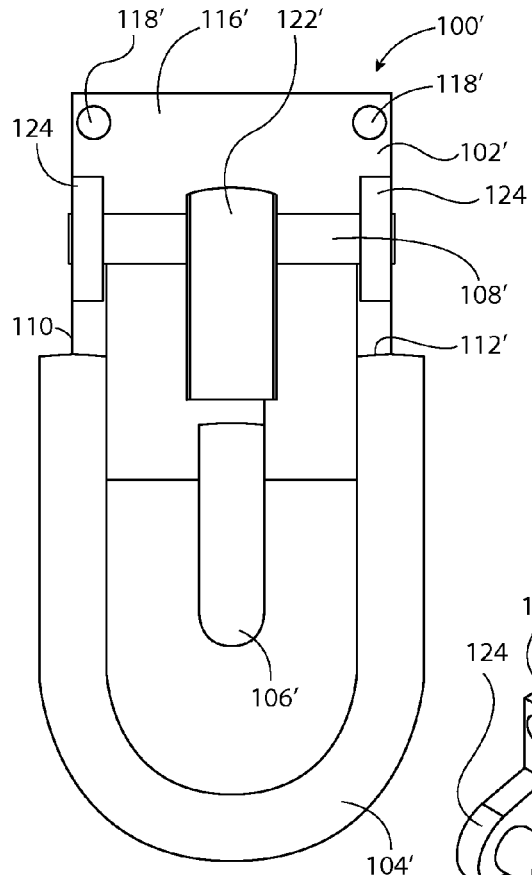
FIG. 4 is a top view of a tow adapter according to a second embodiment.
Figure 5:
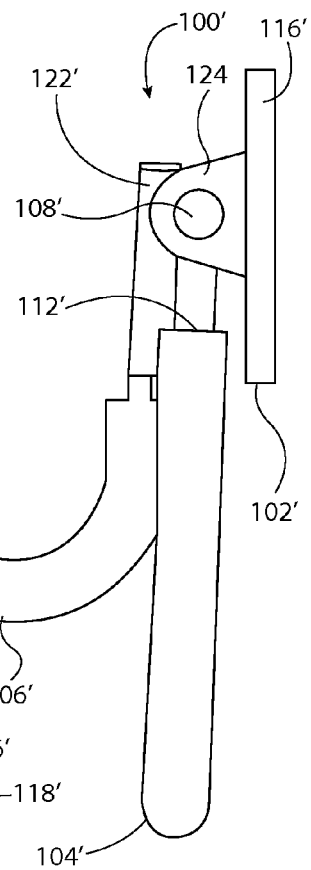
FIG. 5 is a side view of the tow adapter according to the second embodiment.
Figure 6:
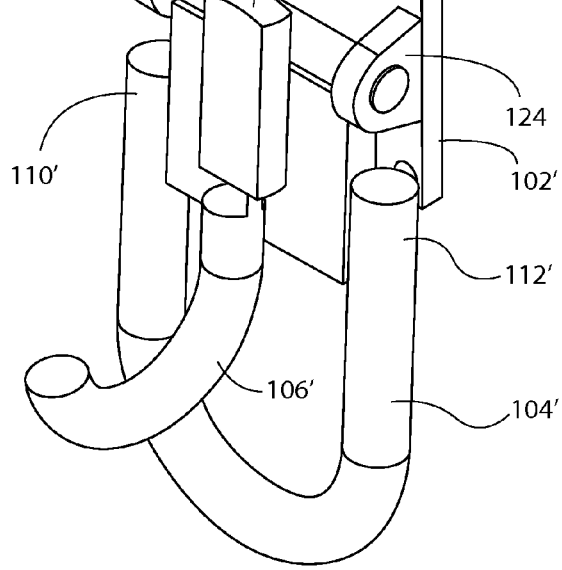
FIG. 6 is a perspective view of the tow adapter according to the second embodiment.

Various embodiments of the pivoting tow hook are illustrated in FIGS. 1-6. A first embodiment of the pivoting tow hook is illustrated in FIGS. 1-3, while a second embodiment of the pivoting tow hook is illustrated in FIGS. 4-6. The pivoting tow hook is provided to allow a towing vehicle to couple to a device to be towed by means of a tether, such as a chain, strap, rope, or other flexible length.

According to the embodiment illustrated in FIGS. 1-3, a pivoting tow hook 100 is provided. The pivoting tow hook 100 includes a bracket 102 for securing the tow hook to a towing vehicle, a loop 104 for receiving a tether 126, and a hook 106 for securing the tether 126. The embodiment illustrated in FIGS. 1-3 further includes a pin 108 which may be a threaded rod, such as a bolt, a solid rod, or some other type of fastener.

According to the illustrated embodiment, the loop 104 includes opposite first 110 and second 112 ends. Each of the opposite ends 110, 112 includes an opening for receiving the pin 108, allowing the loop 104 to freely pivot about the pin 108. The bracket 102 further includes stops 114 limiting the travel of the loop 104.

The bracket 102 according to the first embodiment is manufactured by stamping a single piece of metal to form the desired shape. This shape includes a backplate 116 for securing the bracket 102 to the towing vehicle, with integral mounting holes 118 for receiving fasteners 128 or the like.

The bracket also includes a base 120. According to the first embodiment, the hook 106 is secured to the loop 104 and immovable relative thereto. Finally, the bracket includes stops 114 for limiting the travel of the loop 104 and hook about the pin 108. As illustrated in FIG. 2, these stops 114 are positioned so that the loop 104 can be moved from a flush position parallel to the backplate 116 and a normal position perpendicular to the backplate 116. In the flush position, the hook 106 and loop 104 are not available for securing the tether 126 while in the normal position both the hook 106 and loop 104 are positioned to receive the tether 126.

Further according to this first illustrated embodiment, the pin 108 is removable. The pin 108 may be, for example, a bolt or other type of screw fastener secured either by a separate fastener (such as a nut) or one of the ends 110, 112 of the loop 104 may be threaded to receive the pin 108. Alternatively, the pin may be a solid or hollow, non-threaded length of metal, secured by means well known in the art, such as a cotter pin, split pin, retaining pin, spring clip, or the like. The pin 108 is designed to be easily removed with appropriate tools, such as a wrench (for a threaded rod) or spring clip pliers (for a pin and spring-clip assembly) and replaced without requiring additional tools, such as a welding device. This arrangement allows for the loop 104 and hook 106 to be removed from the tow hook 100 by a consumer or end-user.

A second arrangement of the pivoting tow hook is illustrated in FIGS. 4-6 and designated generally 100'. According to this embodiment of the invention, the tow hook 100' includes a bracket 102', a loop 104', a hook 106', and a pin 108'. The loop 104' includes opposite first 110' and second 112' ends pivotally secured to the bracket. The pin 108' is designed to pivot relative to the loop 104' and bracket 102'. The hook 106' includes a base 122' that is attached to the pin 108' and the loop 104', such as by welding. The base of the hook 122' extends on opposite sides of the pin 108' and provides a stop against further travel of the hook 106' and loop 104'.

Further according to this embodiment, the bracket 102' includes a backplate 116' with integrally formed mounting holes 118' for attaching the bracket 102' to the towing vehicle. The bracket also includes side plates 124 for holding the pin 108' in position. These side plates 124 are welded to the backplate 116' and allow the pin 108' to pivot freely.

The loop 104' includes opposite first 110' and second 112' ends, these opposite ends may be secured to the bracket 102' so that the hook does not pivot relative to the bracket 102'.

In the illustrated embodiment, the hook 106' and loop 104' are movable between a first position where the hook and loop together are used for securing a tether and a second position where the hook and loop are flush with the towing vehicle. In this second arrangement, the hook and loop are in a stored position and not used for securing a tether.

Also disclosed in this application is a method for securing a device to be towed to a towing vehicle. This method includes the steps of assembling a tow adapter, attaching the tow adapter to a vehicle, attaching a tether to the device to be towed, and securing the tether to the tow adapter.

According to the first step of the method, a tow adapter is assembled. In a first embodiment, illustrated in FIGS. 1-3, the tow adapter includes a bracket 102, a loop 104, and a hook 106. The bracket 102 includes a backplate 116 for securing the bracket to the towing vehicle and a base 120. The loop 104 includes opposite first 110 and second 112 ends. These opposite first and second ends 110, 112 include openings for receiving the pin 108, about which the loop 104 can pivot. The hook 106 is welded or otherwise fixed to the loop 104. This allows the hook 106 and loop 104 to be moved between a flush position and a normal position where the tether may be secured to the loop 104 and hook 106. The bracket 102 further includes stops 114 for limiting the travel of the hook 106 and loop 104.

In a second step of the method, the bracket 102 of the tow adapter 100 is attached to the towing vehicle. The bracket 102 may be attached using fasteners, such as screws or bolts, or the bracket 102 may be welded or otherwise removably or permanently secured to the towing vehicle. According to the preferred embodiment, the bracket is attached by fasteners, such as bolts. The tow adapter 100 is secured to the towing vehicle so that in the flush position the loop 104 points downward towards the tires of the towing vehicle and in the normal position the loop 104 extends away from the vehicle.

In the next step of the method, a tether is attached to the device to be towed. The device to be towed may be a trailer, another vehicle, or other type of commonly towed object. The tether may be a strap, rope, chain, or other commonly used tether for securing towing vehicles to devices to be towed. The tether is secured to the device to be towed by tying, hooking, looping or otherwise attaching the tether to the device to be towed according to means well known in the art.

Finally, the tether is attached to the tow adapter. When the hook and loop are in a normal position, the tether is secured to the loop by threading the tether over and through the loop and attaching the tether to the hook. The slack in the tether may then be drawn up, causing the tether to securely wrap about the hook and lock onto the hook, preventing the tether from accidentally becoming unhitched during towing. When the hook and loop are in a flush position the assembly is in a stored position and the tether may not be attached to the hook and loop.

Also disclosed in this application is a kit for a tow adapter 100. The tow adapter 100 is suitable for coupling a device to be towed to a towing vehicle. The kit includes a bracket 102 securable to a towing vehicle, the bracket including a U-shaped loop 104 having opposite first 110 and second 112 ends for receiving a tether for towing the device to be towed and a hook 106 central of the opposite first 110 and second 112 ends, the hook 106 and loop 104 pivotable relative to the bracket 102. Fasteners are also provided suitable for fastening the bracket 102 to the vehicle. In one embodiment, the kit may also include a pin 108 for securing the loop 104 to the bracket 102 and allowing the loop to pivot about the pin relative to the bracket. The kit may also include a tether, such as a strap, chain, or rope, for connecting the towing vehicle to the device to be towed. The strap is adapted to connect the towing vehicle to the device to be towed by passing the tether over and through the loop and attaching the tether to the hook.

The bracket 102 of the above described kit may include stops for limiting travel of the loop 104 about the pin 108, a backplate 116 for connecting the bracket 102 to the towing vehicle, mounting holes 118 for receiving fasteners used to attach the bracket 102 to the towing vehicle, and a base 120 for supporting the hook 106. The hook 106 may be welded to the loop 104, so that the loop 104 and hook 106 may pivot together.

According to the above described kit, the loop 104 and hook 106 of the tow adapter 100 are movable between a flush position and a normal position. The flush position may be useful for storing the tow hook in an unused position. When the loop 104 and hook 106 are in the normal position, the tether may be secured to both the loop 104 and the hook 106 to enable towing of a device to be towed. The tether is secured to the loop 104 and hook 106 by passing the tether over and through the loop 104, forming at least one winding about the loop 104, and securing the tether to the hook 106.

While the invention has been described with reference to certain embodiments it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments falling within the scope of the appended claims.

What is claimed is:

1. A tow adapter for coupling a device to be towed to a towing vehicle, the tow adapter comprising:
   a bracket adapted to be attached to the towing vehicle to support the tow adapter;
   a loop suitable to support a tether to enable the towing vehicle to tow the device to be towed, the loop having a first end and a second end each operably mounted to the bracket;
   a hook operably mounted to the bracket and positioned central of the loop such that at least part of a curved portion of the hook is disposed within the loop, the hook and the loop being pivotable relative to the bracket about a pivot operably attached to the bracket; and
   wherein the loop and the hook are configured to enable the tether to thread through the loop and attach to the hook.

2. The tow adapter as claimed in claim 1, wherein the pivot comprises a pin.

3. The tow adapter as claimed in claim 2, wherein the pin comprises a threaded rod.

4. The tow adapter as claimed in claim 1, wherein the loop and the hook are configured to pivot together relative to the bracket.

5. The tow adapter as claimed in claim 1, wherein the bracket comprises a welded assembly and includes a stop configured to limit an extent of travel of the hook and the loop.

6. A kit for a tow adapter suitable for coupling a device to be towed to a towing vehicle, the kit comprising:
   a bracket adapted to be fastened to the towing vehicle;
   a U-shaped loop having opposite first and second ends each operably mounted to the bracket, the loop for receiving a tether for towing the device to be towed; and
   a hook operably mounted to the bracket and positioned central of the opposite first and second ends of the loop such that at least part of a curved portion of the hook is disposed within the loop, the hook and the loop being pivotable relative to the bracket about a pivot operably attached to the bracket, wherein the loop and the hook are configured to enable the tether to thread through the loop and attach to the hook; and
   fasteners suitable to fasten the bracket to the towing vehicle.

7. The kit as claimed in claim 6, wherein the pivot comprises a pin.

8. The kit as claimed in claim 7, wherein the loop and the hook are configured to pivot together relative to the bracket.

9. The kit as claimed in claim 8, wherein the first and second ends of the loop each include an opening for receiving the pin.

10. The kit as claimed in claim 9, wherein the pin comprises a threaded rod.

11. The kit as claimed in claim 7, wherein the pin comprises a threaded rod.

12. The kit as claimed in claim 6, wherein the bracket comprises a welded assembly including the pivot, and the pivot comprises a pin.

13. The kit as claimed in claim 12, wherein the pin comprises a threaded rod.

14. The kit as claimed in claim 12, wherein where the hook is secured to the pin and includes a stop for limiting rotation of the hook.

15. The kit as claimed in claim 6, wherein the loop and the hook are configured to pivot together relative to the bracket.

16. The kit as claimed in claim 6, wherein the first and second ends of the loop each include an opening for receiving the pivot.

17. The kit of claim 6, wherein the bracket comprises a welded assembly and includes a stop configured to limit an extent of travel of the hook and the loop.

18. The kit as claimed in claim 6, further comprising a tether.

19. A method for securing a device to be towed to a towing vehicle, the method comprising the steps of:
   a. providing a tow adapter including: a bracket, a loop having a first end and a second end each operably mounted to the bracket, and a hook operably mounted to the bracket and positioned central of the loop such that at least a portion of the hook is disposed within the loop, the hook and the loop being pivotable relative to the bracket about a pivot operably attached to the bracket;
   b. attaching the bracket to the towing vehicle; and
   c. attaching a tether to the device to be towed, threading the tether through the loop, and attaching the tether to the hook.

20. The method of claim 19, wherein the loop and the bracket are configured to pivot together relative to the bracket.

* * * * *